(12) United States Patent
Kindelspire

(10) Patent No.: US 9,757,778 B1
(45) Date of Patent: Sep. 12, 2017

(54) SYSTEM AND DEVICE FOR CLEARING BLOCKAGE FROM A FLOW ORIFICE

(71) Applicant: Joshua Kindelspire, Brookings, SD (US)

(72) Inventor: Joshua Kindelspire, Brookings, SD (US)

( * ) Notice: Subject to any disclaimer, the term of this patent is extended or adjusted under 35 U.S.C. 154(b) by 151 days.

(21) Appl. No.: 14/808,168

(22) Filed: Jul. 24, 2015

Related U.S. Application Data

(62) Division of application No. 14/048,115, filed on Oct. 8, 2013, now abandoned.

(51) Int. Cl.
*B05B 15/02* (2006.01)
*B08B 9/032* (2006.01)

(52) U.S. Cl.
CPC .................................. *B08B 9/032* (2013.01)

(58) Field of Classification Search
CPC ....... B08B 9/032; F16K 41/103; B05B 15/02; B05B 15/008; B05B 1/16; B05B 15/0208; B05B 7/12; B05B 15/0258
USPC ................ 239/106, 113, 119, 159–170, 172, 239/569–588, 600, 602
See application file for complete search history.

(56) References Cited

U.S. PATENT DOCUMENTS

| | | | | |
|---|---|---|---|---|
| 2,168,636 A | * | 8/1939 | Wheler | B08B 9/0323 137/207.5 |
| 3,012,752 A | | 12/1961 | Buck | |
| 5,211,335 A | | 5/1993 | Strid | |
| 5,294,052 A | | 3/1994 | Kukesh | |
| 5,899,384 A | | 5/1999 | Solbakke | |
| 5,947,381 A | | 9/1999 | Carey | |
| 6,126,087 A | | 10/2000 | Hedger | |
| 7,179,390 B1 | * | 2/2007 | Layton | F16N 39/06 123/196 A |
| 7,510,662 B1 | * | 3/2009 | Hansen | F01P 11/06 134/102.2 |
| 2010/0305507 A1 | | 12/2010 | Duncan | |

* cited by examiner

*Primary Examiner* — Christopher Kim
*Assistant Examiner* — Adam J Rogers
(74) *Attorney, Agent, or Firm* — Jeffrey A. Proehl; Woods, Fuller, Shultz & Smith, P.C.

(57) ABSTRACT

In an applicator assembly for applying a fluid in which the applicator assembly defines at least a portion of a flow path, the assembly may comprise an upstream fluid source, a downstream applicator for forming a point of application, a conduit generally connecting the fluid source to the applicator, an orifice structure defining an orifice opening configured such that fluid flowing along the flow path passes through the orifice opening, and an orifice inverting structure configured to reverse flow through the orifice opening of the orifice structure.

16 Claims, 4 Drawing Sheets

SYSTEM AND DEVICE FOR CLEARING BLOCKAGE FROM A FLOW ORIFICE

REFERENCE TO RELATED APPLICATION

This application is a divisional of U.S. non-provisional patent application Ser. No. 14/048,115, filed Oct. 8, 2013, which is hereby incorporated by reference in its entirety.

BACKGROUND

Field

The present disclosure relates to flow control orifices and more particularly pertains to a new system and device for clearing blockage from a flow orifice for facilitating the clearing of the blockage without, for example, having to remove the orifice from the supporting assembly in a field.

SUMMARY

In one aspect, the disclosure relates to an applicator assembly for applying a fluid, with the applicator assembly defining at least a portion of a flow path. The assembly may comprise an upstream fluid source, a downstream applicator for forming a point of application, a conduit generally connecting the fluid source to the applicator, an orifice structure defining an orifice opening configured such that fluid flowing along the flow path passes through the orifice opening, and an orifice inverting structure configured to reverse flow through the orifice opening of the orifice structure.

In another aspect, the disclosure relates to an orifice inverting assembly for changing an orientation of an orifice opening in a flow path with respect to an upstream location and a downstream location. The orifice opening may be formed by an orifice member, and the assembly may comprise a housing having an inlet for forming a portion of the flow path in communication with the upstream location in the fluid path and an outlet for forming a portion of the flow path in communication with the downstream location in the fluid path. The housing may define a chamber in fluid communication with the inlet and outlet. The assembly may further comprise a body positioned in the chamber and being rotatable in the chamber, with the body being configured to receive the orifice member such that rotation of the body with respect to the housing rotates the orifice opening in the orifice member with respect to the flow path through the housing.

In yet another aspect, the disclosure may be directed to a system for distributing a fluid to multiple locations. The system may include an agricultural implement, a fluid source for the implement, a manifold in fluid communication with the fluid source, with the manifold having a plurality of outlets. The system may also include a plurality of applicator assemblies, with each application assembly defining a flow path from the manifold to a point of application. The manifold may define an upstream location on the flow path and the point of application defining a downstream location on the flow path. Each applicator assembly may include an applicator in fluid communication with a conduit fluidly connected to one outlet of the plurality of outlets of the manifold. Each applicator assembly may include an orifice structure for substantially equalizing flow between the applicators of the plurality of applicator assemblies, each orifice structure forming an orifice opening configured such that fluid flowing through the applicator assembly passes through the orifice opening of the orifice structure, and an orifice inverting structure configured to reverse flow through the orifice opening of the orifice structure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and shall not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
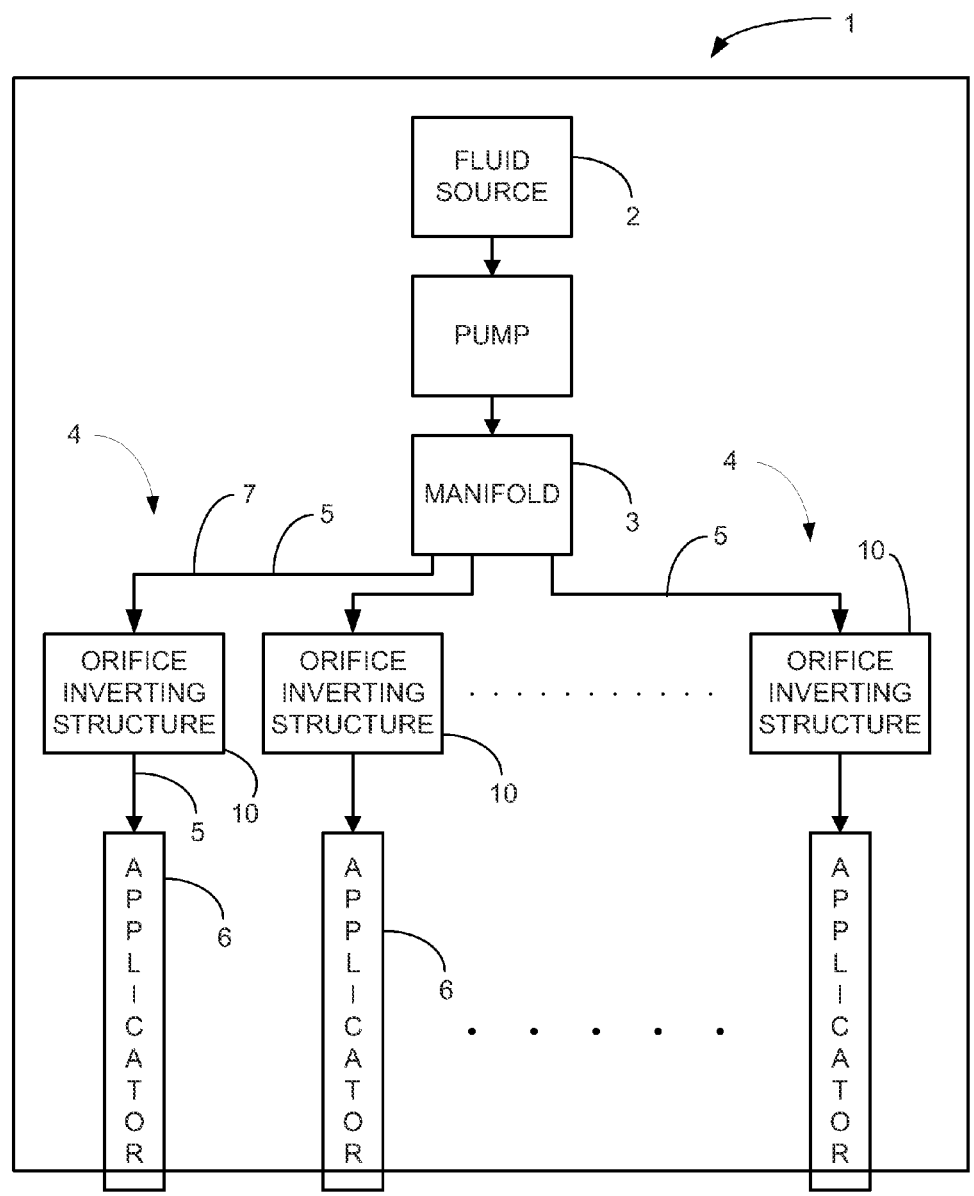
FIG. 1 is a schematic diagram of an illustrative system for employing the new device for clearing blockage from a flow orifice according to the present disclosure.
Figure 2:
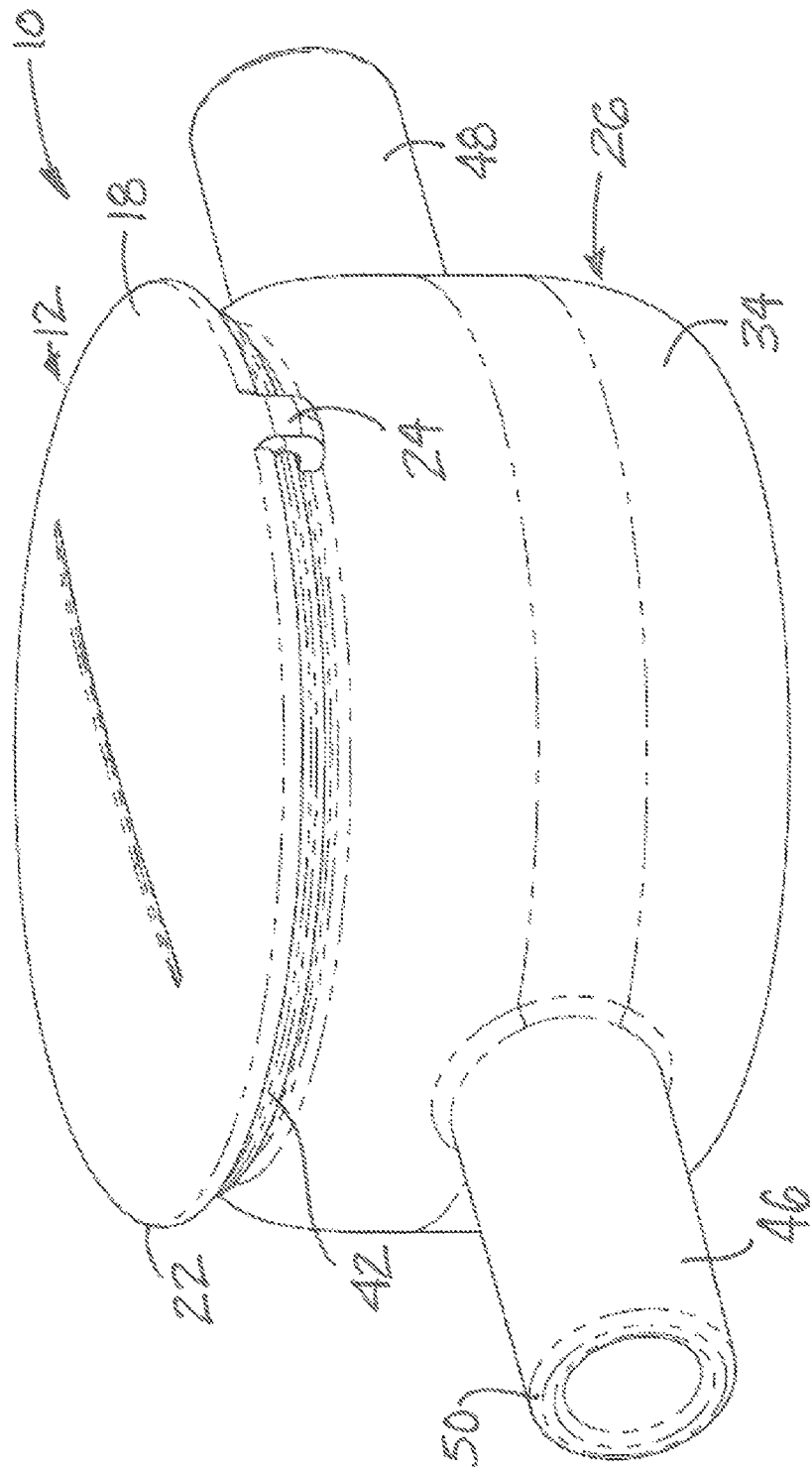
FIG. 2 is a schematic perspective view of an illustrative orifice inverter device, according to an illustrative embodiment.
Figure 3:
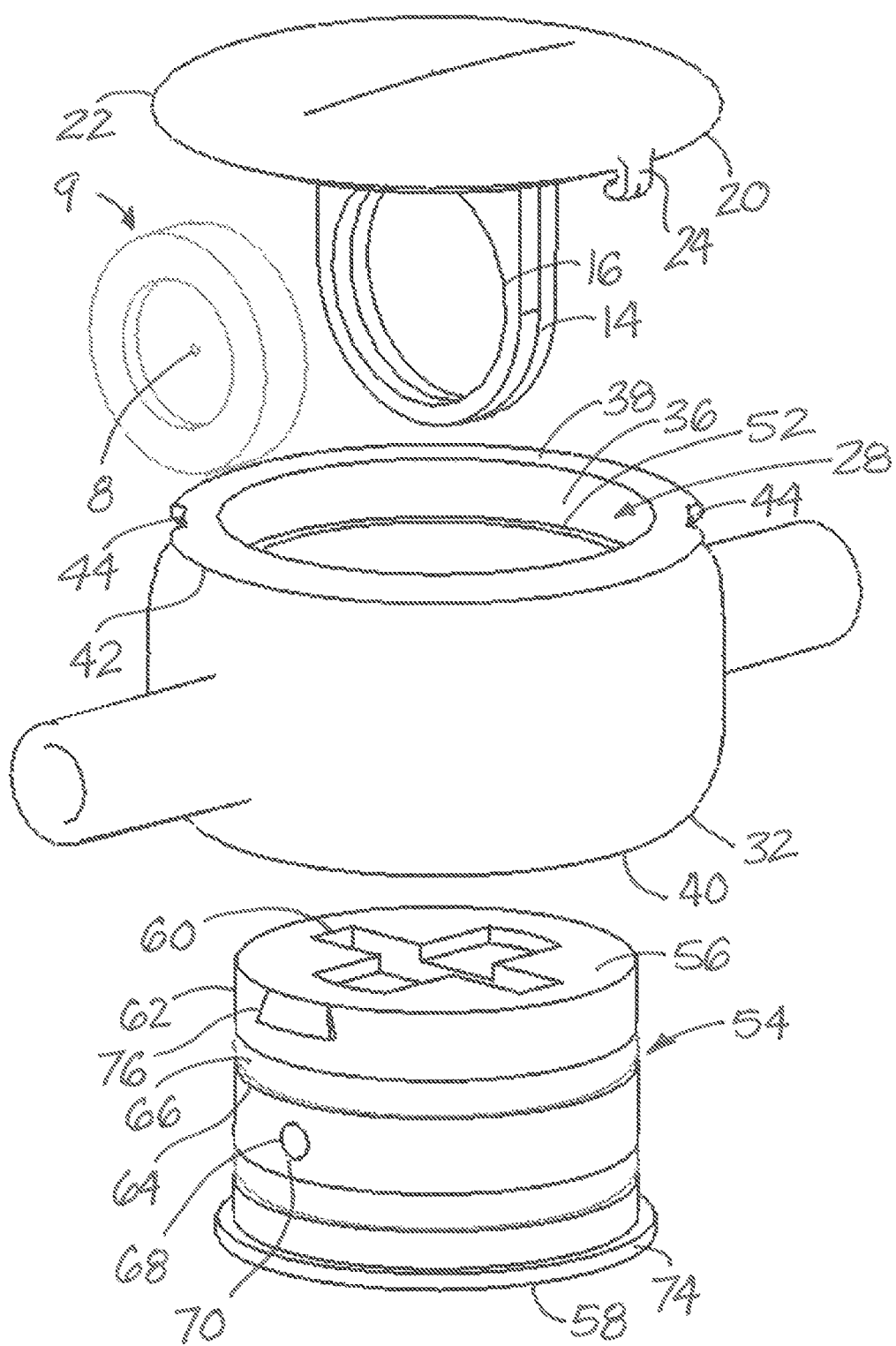
FIG. 3 is a schematic exploded perspective view of the illustrative orifice inverter device, according to an illustrative embodiment.
Figure 4:
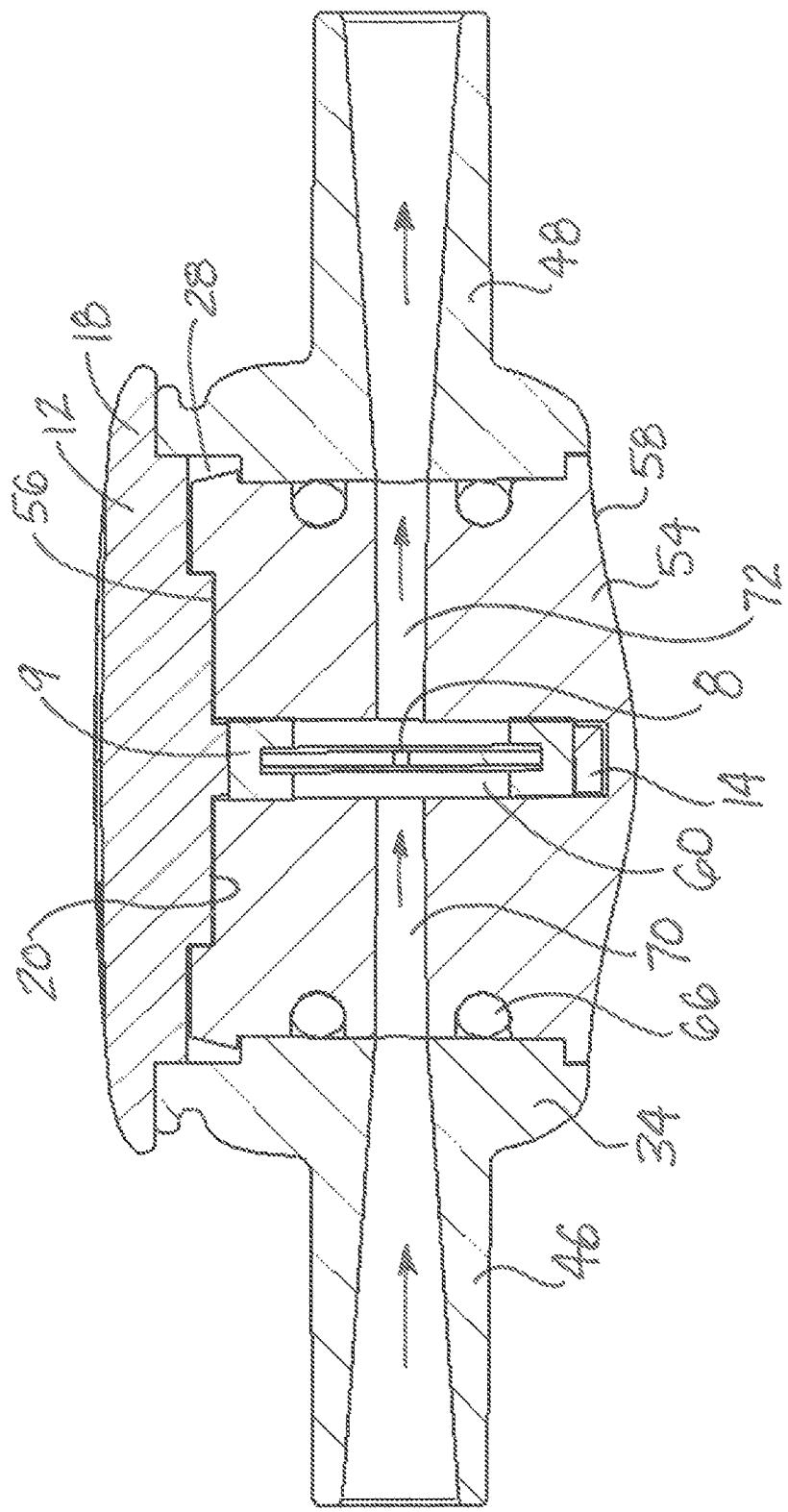
FIG. 4 is a schematic side sectional view of the illustrative orifice inverter device, according to an illustrative embodiment.

With reference now to the drawings, and in particular to FIGS. 1 through 4 thereof, a new system and device for clearing blockage from a flow orifice embodying the principles and concepts of the disclosed subject matter will be described.

On one aspect, the disclosure relates to an applicator system 1 for distributing a fluid to multiple locations, such as, for example, multiple locations behind an agricultural implement being moved across a field. The usefulness of the system and the components thereof are not necessarily limited to implementation on an agricultural implement, but for the purposes will be illustratively described in the context of an agricultural implement comprising a planter implement for applying a fertilizer or other substance in liquid form.

The illustrative system 1 may include a fluid source 2 from which the fluid is supplied, and which is commonly formed by a tank although the use of at tank is not critical. The system 1 may also include a manifold 3 (or other means of dividing the fluid flow, such as a flow divider) that is fluidly connected to the tank so as to be in fluid communication with the tank and the contents thereof. Optionally, a pump may be employed to move the fluid from the fluid source to the manifold and pressurize the system. The manifold 3 may have at least one outlet, although in most cases the manifold will have multiple or a plurality of outlets for each receiving fluid from the tank via the manifold.

The system 1 may further include a plurality of applicator assemblies 4, and typically each applicator assembly will be associated with a row being planted or otherwise treated with the fluid. Each application assembly 4 may define a flow path 5 that generally extends from the manifold to a point of application, which is typically a location just above (or below) the surface of the ground of the field (but again the particular character of the applicator is not critical to the disclosure). Thus the system may have a plurality of points of application. The manifold 3 may thus define an upstream location on the flow path 5 and the point of application may define a downstream location on the flow path.

Each applicator assembly 4 may include an applicator 6 located at the point of application associated with the applicator assembly. Each applicator being configured to apply fluid to the ground below the implement, and as each applicator may be associated with a different row of the crop, the applicators are positioned on the implement to apply fluid to the ground surface at locations that are at different distances from a midline of the implement (the midline being generally aligned with a direction of movement of the implement across the field). Each applicator assembly may also include a conduit 6 fluidly connected to one outlet of the manifold 3 and extending toward one point of application and being fluidly connected to the applicator of the respective assembly 4 at that location. As the separation of the applicators 6 of the various applicator assemblies 4 varies from the midline of the implement, the conduits of the assemblies 4 have a plurality of various lengths to reach the applicators.

The system 1 may also include a plurality of orifice structures that form an orifice for substantially equalizing flow pressure among the plurality of applicators due to variations and conditions between the manifold (or other fluid source) and the point of application. Each orifice structure may form or provide an orifice opening 8 that is associated with each of the applicator assemblies such that fluid flowing through the flow path 5 of the applicator assembly passes through the orifice opening of the orifice structure. Typically, the size of the orifice openings associated with the applicator assemblies are substantially uniform and equal, although some variation in orifice size may be employed.

In some embodiments, the orifice structure may comprise an orifice member 9 having the orifice opening 8 formed therein, and having a first side and a second side with the orifice opening extending between the first and second sides. The orifice member may have an outer perimeter gasket or seal, and in many embodiments the gasket or seal may be a separate piece. The perimeter gasket may have a substantially circular or annular shape, although this shape is not critical. In some embodiments, the orifice member 9 may comprise a relatively thinner disc and a relatively thicker perimeter gasket.

Applicant has recognized that the flow orifices utilized to equalize the pressure between applicators in a fluid application system, such as may be implemented on an agricultural implement, are vulnerable to blockage by small particles and debris in the fluid being applied due to the small size of the orifice. The size of the orifice is selected to equalize the pressure, and not to provide any significant filtering function, so the size of the orifice may be significantly smaller than any filter in the applicator assembly. The blockage by the debris reduces or stops the flow through the orifice and thus through the applicator associated with the orifice. The operator of the implement must typically leave the cab of the tractor pulling the implement and remove the orifice member from the flow path and clear the debris. This operation is time consuming, involves small parts that may be dropped and lost in the field, and may expose the operator to the fluid being applied.

Applicant has developed a method and apparatus for clearing the orifice of the blocking debris without having to disassemble the structure holding the orifice in the field and relatively rapidly returning the orifice to an operational condition. In one aspect, the clearing of the debris is accomplished by reversing or inverting the orientation of the orifice-forming structure with respect to the flow path so that the blocking debris is effectively moved from the upstream side of the orifice-forming structure to the downstream side of the orifice-forming structure, where the debris can be flushed through the applicator. One way of accomplishing this reversal is to rotate or flip the orifice-forming structure with respect to the flow path. The orifice-forming structure is thus cleared without removing the structure from any supporting structure or contact with the operator or possibility of loss of parts of the structure.

As an exemplary illustration of structure capable of performing the reorientation of the orifice-forming structure, another aspect of the disclosure relates to an orifice inverting structure 10 which may be used as a part of the system 10. An orifice inverting structure 10 may be associated with each of the applicator assemblies 4, and more specifically with the orifice member 9 associated with each of the assemblies 4. An orifice inverting structure 10 may be configured to reverse flow through the orifice opening of the associated orifice structure, the orifice inverting structure being configured to move or shift or rotate or flip one of the sides of the orifice member from an orientation facing the upstream location in the flow path 5 to an orientation in which the one side faces the downstream location in the flow path. While the character of the movement of the orifice-forming structure used to cause this reorientation is not critical to the functionality, rotation of the structure about an axis that is perpendicular to the axis of the orifice is highly suitable for accomplishing this reversal. The orifice inverting structure 10 may turn the orifice member 9 with respect to the flow path. In at least some of the embodiments, the orifice inverting structure, with or without the orifice member installed, is incapable of blocking the flow through the structure and has no positive stops for causing such a blockage of flow.

In the illustrative embodiments, the orifice inverting structure 10 may include an orifice support 12 which may removably receive the orifice member 9, and while the removability is beneficial it is not critical. The orifice support 12 may comprise a frame 14 which may form or define a support aperture 16 with a shape that may generally correspond to the size and shape of the outer perimeter of the orifice member 9. The orifice inverting structure 10 may further include a retainer cap 18. The retainer cap 18 may have an inner surface 20, and the orifice support may extend from the inner surface and the support 12 and the cap 18 may be integrally formed together. The retainer cap 18 has a periphery 22, and at least one lock tab 24 may extend from the periphery. In some of the most preferred embodiments, a pair of lock tabs 24 are included and positioned at substantially opposite locations on the cap 18.

The orifice inverting structure 10 may also include a housing 26 which may define a chamber 28. The orifice support 12 may be positionable in the chamber when the retainer cap is in a mounted condition on the housing. The retainer cap 18 may be removably mountable on the housing. The chamber 28 may extend between a first opening 30 on the housing and a second opening 32 on the housing. The housing 26 may include a perimeter wall 34 with an inner surface 26, and the inner surface may be substantially cylindrical in shape between the first 30 and second 32 openings. The first opening 30 may be defined by a first rim 38 and the second opening 32 may be defined by a second rim 40. A perimeter lip 42 may be formed along the first rim 38 and may have a tab slot 44 for receiving the at least one lock tab, and in some embodiments a pair of the slots 44 may be included to accept a pair of the tabs 24. The housing 26 may have an inlet 46 and an outlet 48, which may be positioned on opposite sides of the housing although this is not critical and typically there is no substantial structural difference between the inlet and outlet. The inlet and outlet may be in communication with the chamber, and may open in the inner surface of the perimeter wall. A conduit connector 50 may be associated with each of the inlet and the outlet. The conduit connectors 50 may be mounted on the perimeter wall and may extend radially outwardly from the perimeter wall. A retaining ridge 52 may be formed on the inner surface 26 of the perimeter wall and may extend inwardly into the chamber.

The orifice inverting structure 10 may include a body 54 for positioning in the chamber 28 of the housing. The body may be removably positionable in the chamber, such as by movement through the second opening 32 of the housing into the chamber. The body 54 has a near side 56 for positioning relatively closer to the retainer cap and a far side 58 for positioning relatively further away from the retainer cap. The body 54 may also have a recess 60 extending into the body, and may be configured so that the orifice support 12 is insertable into the recess. The recess 60 may extend into the near side of the body, and may be formed as a slot. The body 54 may have a perimeter surface 62 for positioning adjacent to the inner surface of the perimeter wall, and the perimeter surface being substantially cylindrical to substantially correspond to the shape of the inner surface of the perimeter wall, but slightly smaller, such that the body is able to rotate inside of the chamber with the application of some level of externally-applied force.

The body 54 may also have at least one sealing slot 64 formed in the perimeter surface 62, and the slot may extend circumferentially about the body for receiving an O-ring seal 66. The body may have a fluid passage 68 with a first portion 70 and a second portion 72. The first portion of the passage 68 may extend between the recess 60 and the perimeter surface 62, and the second portion extending between the recess and the perimeter surface at a location substantially opposite of a location of the first portion. The inlet and outlet formed in the perimeter wall of the housing (as well as the conduit connectors if utilized) may form a continuous portion of the flow path 5 with the first and second portions of the fluid passage, and the positioning of the orifice member 9 in the recess of the body may complete the path with the orifice opening. Typically, although not critically, the widths of the passage portions, as well as the inlet and outlet in the perimeter wall, will be substantially larger than the size of the orifice opening, so that the orifice member creates a substantially larger flow restriction relative to the other elements of the inverting structure. Illustratively, the widths of the passage portions at the recess may be approximately two or three or four times or more larger than the width of the orifice opening. If stops or detents are employed for rotation of the body with respect to the perimeter wall, typically the stops or detents will be engaged at rotational positions approximately 180 degrees from each other, preferably when the passage portions 70, 72 of the body are each in substantially full alignment with either the inlet or the outlet of the perimeter wall to allow flow without substantial restriction caused by the body and perimeter wall (while the orifice member may still restrict).

A flange 74 may be formed on the body 54 and may extend outwardly from the perimeter surface 62. In some embodiments, the flange may extending circumferentially about the body although this is not critical. The flange 74 may be positioned toward the far side 58 of the body, and the flange may be configured to limit movement of the body in the chamber, and may properly set the extent of insertion of the body into the chamber. The body 54 may have at least one retainer tab 76 that extends from the perimeter surface for engaging the retaining ridge 52 in a slight interference it such that the interaction of the ridge and tab hold the body in the chamber unless a significant degree of disclosing force is applied. A pair of the retainer tabs may be employed and extend in substantially opposite directions. The retainer tab or tabs may be located toward the near side of the body.

In use, an orifice inverting structure may be incorporated into one or more of the applicator assemblies of an applicator system, and typically will be implemented on each applicator assembly of a system. The orifice member is inserted into the orifice support and is inserted into the recess of the body. The body is oriented in the chamber of the housing so that the passage portions 70, 72 of the body are substantially aligned with the inlet and outlet of the perimeter wall of the housing to create a complete and relatively unobstructed flow path through the structure 10. The applicator system may be utilized in the typical manner, and when a blockage of the orifice is detected (by any suitable manner, such as a lack of flow downstream at the applicator or an increase in pressure upstream) then the orientation of the orifice with respect to the flow path may be changed or reversed by turning rotating the body with respect to the housing. The degree to which the body is rotated may be approximately 180 degrees, although that is not critical. The body may be rotated, for example, by the operator grasping or engaging a tool with the cap, and turning the cap which in turn rotates the body and the orifice member. The turning may also be accomplished by engaging the body rather than the cap. Also, in addition to manual rotation of the cap or body, an automated rotation may be implemented using any suitable device, including, for example, a motor or solenoid or linear actuator.

The rotation of the orifice member using the structure 10 thus moves the blocking or interfering particle or other debris from the upstream side of the member 9 to the downstream side of the member 9, and the flow of the fluid through the structure 10 will tend to move the debris away from the orifice opening and likely downstream where it can be passed out of the system 1. Upon the next instance of blockage of the fluid flow, the orientation of the orifice member may be reversed with respect to the flow again, such as by a reorientation of 180 degrees.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for controlling distribution of a fluid to multiple locations on an agricultural implement, the system including:
   an agricultural implement;
   a fluid source for the implement;
   a manifold in fluid communication with the fluid source, the manifold having a plurality of outlets;
   a plurality of applicator assemblies, each application assembly defining a flow path from the manifold to a point of application, the manifold defining an upstream location on the flow path and the point of application defining a downstream location on the flow path, at least two of the applicator assemblies including:
     an applicator in fluid communication with a conduit fluidly connected to one outlet of the plurality of outlets of the manifold;
     an orifice structure for each applicator and substantially equalizing flow to the applicators of the plurality of applicator assemblies, each orifice structure including an orifice member defining a single orifice opening configured such that fluid flowing through the applicator assembly passes through the orifice opening of the orifice structure; and
     an orifice inverting structure configured to reverse flow through the single orifice opening of the orifice structure such that any debris obstructing the orifice opening is dislodged from the opening by the reversed flow and released to pass through the applicator;
     wherein the orifice opening is of a size selected to constrict the flow path and thereby restrict the flow to substantially equalize flow through the applicators of the respective applicator assemblies, the orifice member being removable from the orifice inverting structure to permit removal and replacement of the orifice member to adjust the size of the orifice opening of the applicator assembly.

2. The system of claim 1 wherein the orifice member has a first side and a second side with the orifice opening extending between the first and second sides, the orifice inverting structure being configured to move the orifice member such that the first side of the orifice member changes from an orientation directed toward the fluid source upstream in the flow path to an orientation directed toward the applicator downstream in the flow path.

3. The system of claim 1 wherein the orifice inverting structure turns the orifice member with respect to the flow path.

4. The system of claim 1 wherein each applicator is configured to apply fluid to a ground surface below the implement, the applicators applying fluid to the ground surface at locations at different distances from a midline of the implement aligned with a direction of movement of the implement across the field.

5. The system of claim 1 wherein the body defines a passage portion of the fluid path, a width of the passage portion being substantially larger than a width of the orifice opening.

6. The system of claim 1 wherein the orifice opening has a width, and portions of a fluid passage on either side of the orifice structure have substantially uniform widths, the widths of the portions being two or more times larger than the width of the orifice opening.

7. The system of claim 1 wherein the orifice inverting structure comprises a housing having an inlet for forming a portion of the flow path in communication with the fluid source and an outlet in communication with the applicator of the applicator assembly, the housing defining a chamber in fluid communication with the inlet and outlet; a body positioned in the chamber and being rotatable in the chamber between at least a first rotational position and a second rotational position, the body having a recess configured to removably receive the orifice member such that rotation of the body with respect to the housing rotates the orifice opening in the orifice member with respect to the flow path through the housing; wherein the body has a perimeter surface and defines a fluid passage with a first portion and a second portion, the first portion and the second portion each extending between the recess and the perimeter surface, the first and second portions of the fluid passage in the body member being selectively and alternately alignable with the inlet and outlet in the housing to facilitate fluid communication therebetween in the first and second rotational positions; and wherein the first and second portions of the passage are similarly configured to provide similar flow characteristics in the first rotational position and the second rotational position.

8. The system of claim 7 wherein the orifice member has a first side and a second side with the orifice opening extending between the first and second sides, and wherein rotation of the body moves the orifice member such that the first side of the orifice member changes from an orientation facing the inlet of the housing to an orientation facing the outlet of the housing.

9. The system of claim 7 wherein the housing includes a perimeter wall having an inner surface with the inlet and outlet extending to the inner surface; and wherein the inlet and outlet are located at substantially opposite locations on the inner surface of the perimeter wall and the first and second portions of the fluid passage are located at substantially opposite locations on the perimeter surface of the body.

10. The system of claim 7 wherein the housing forms outer portions of the flow path and the body forms inner portions of the flow path.

11. The system of claim 10 wherein the orifice inverting structure further includes a housing defining a chamber and a body rotatable in the chamber, the body removably receiving the orifice member such that rotation of the body with respect to the housing rotates the orifice opening with respect to the flow path.

12. The system of claim 7 wherein a width of the first portion is substantially uniform between the recess and the perimeter surface and a width of the second portion is substantially uniform between the recess and the perimeter surface to facilitate uniform flow through the orifice opening in the first and second rotational positions.

13. The system of claim 7 wherein the first and second portions of the fluid passage in the rotatable body are configured substantially identical from the recess to the perimeter surface to facilitate uniform flow through the orifice opening in the first and second rotational positions.

14. The assembly system of claim 7 wherein the first and second portions of the fluid passage in the rotatable body are mirror images of each other with respect to the plane of the orifice opening to facilitate uniform flow through the orifice opening in the first and second rotational positions.

15. The system of claim 7 wherein a length of the first portion between the recess and the perimeter surface and a length of the second portion between the recess and the perimeter surface is substantially uniform to facilitate uniform flow through the orifice opening in the first and second rotational positions.

16. A system for controlling distribution of a fluid to multiple locations on an agricultural implement, the system including: an agricultural implement; a fluid source for the implement; a manifold in fluid communication with the fluid source, the manifold having a plurality of outlets; a plurality of applicator assemblies, each application assembly defining a flow path from the manifold to a point of application, the manifold defining an upstream location on the flow path and the point of application defining a downstream location on the flow path, at least two of the applicator assemblies including: an applicator in fluid communication with a conduit fluidly connected to one outlet of the plurality of outlets of the manifold; an orifice structure for each applicator and substantially equalizing flow to the applicators of the plurality of applicator assemblies, each orifice structure including an orifice member defining an orifice opening configured such that fluid flowing through the applicator assembly passes through the orifice opening of the orifice structure; and an orifice inverting structure configured to reverse flow through the orifice opening of the orifice structure such that any debris obstructing the orifice opening is dislodged from the opening by the reversed flow and released to pass through the applicator; wherein the orifice inverting structure comprises a housing having an inlet for forming a portion of the flow path in communication with the fluid source and an outlet in communication with the applicator of the applicator assembly, the housing defining a chamber in fluid communication with the inlet and outlet; a body positioned in the chamber and being rotatable in the chamber between at least a first rotational position and a second rotational position, the first and second rotational positions being separated by approximately 180 degrees of rotation, the body having a recess removably receiving the orifice member such that rotation of the body with respect to the housing rotates the orifice opening in the orifice member with respect to the flow path through the housing; wherein the body has a perimeter surface and defines a fluid passage with a first portion and a second portion, the first portion and the second portion each extending between the recess and the perimeter surface, the first and second portions of the fluid passage in the body member being selectively and alternately alignable with the inlet and outlet in the housing to facilitate fluid communication therebetween in the first and second rotational positions.

\* \* \* \* \*